(12) United States Patent
Eigler et al.

(10) Patent No.: US 11,599,342 B2
(45) Date of Patent: Mar. 7, 2023

(54) PATHNAME INDEPENDENT PROBING OF BINARIES

(71) Applicant: Red Hat, Inc., Raleigh, NC (US)

(72) Inventors: Frank Eigler, Toronto (CA); Aaron Merey, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/034,832

(22) Filed: Sep. 28, 2020

(65) Prior Publication Data

US 2022/0100482 A1    Mar. 31, 2022

(51) Int. Cl.
| | |
|---|---|
| G06F 9/44 | (2018.01) |
| G06F 9/445 | (2018.01) |
| G06F 8/41 | (2018.01) |
| G06F 11/36 | (2006.01) |
| G06F 16/903 | (2019.01) |
| G06F 8/30 | (2018.01) |
| G06F 8/65 | (2018.01) |
| G06F 8/61 | (2018.01) |

(52) U.S. Cl.
CPC .......... *G06F 8/44* (2013.01); *G06F 8/30* (2013.01); *G06F 8/61* (2013.01); *G06F 8/65* (2013.01); *G06F 11/362* (2013.01); *G06F 16/90335* (2019.01)

(58) Field of Classification Search
CPC ..... G06F 8/44; G06F 8/30; G06F 8/61; G06F 8/65; G06F 16/90335; G06F 11/362
See application file for complete search history.

(56) References Cited

U.S. PATENT DOCUMENTS 6,826,746 B2 * 11/2004 Evans .................. G06F 11/362
714/E11.21
7,409,677 B1 * 8/2008 Leventhal ................. G06F 8/30
717/130

(Continued)

FOREIGN PATENT DOCUMENTS

| CN | 101984409 A | * | 3/2011 | |
| CN | 1838088 B | * | 3/2012 | ............ G06F 11/362 |

OTHER PUBLICATIONS

Zhaoyan Xu, AUTOPROBE: Towards Automatic Active Malicious Server Probing Using Dynamic Binary Analysis, 2014, pp. 1-12. https://people.engr.tamu.edu/guofei/paper/AutoProbe-CCS2014.pdf (Year: 2014).*

(Continued)

*Primary Examiner* — Mongbao Nguyen
(74) *Attorney, Agent, or Firm* — K&L Gates LLP

(57) ABSTRACT

A system includes one or more processors in communication with a memory and configured to receive a task to probe a portion of the memory associated with a version of a binary file during execution of the binary file. The task includes a portion of object code and a hash identifier, both associated with the version of the binary file. A database mapping hash identifiers to debug information associated with installed binary files is accessed. Debug information for the version of the binary file associated with the hash identifier is retrieved. A probing application is built using the debug information and the portion of object code. Upon execution of the version of the binary file, the probing application places the object code into the portion of the memory.

20 Claims, 7 Drawing Sheets

(56) References Cited

U.S. PATENT DOCUMENTS

| | | | | |
|---|---|---|---|---|
| 8,739,135 | B2* | 5/2014 | Eigler | G06F 11/3466 717/130 |
| 9,021,448 | B1* | 4/2015 | Gagliardi | G06F 11/3636 717/130 |
| 9,934,128 | B2* | 4/2018 | Berk | G06F 11/3644 |
| 10,248,409 | B1* | 4/2019 | Pohlack | G06F 8/658 |
| 10,572,245 | B1* | 2/2020 | Doebel | G06F 8/65 |
| 10,762,200 | B1* | 9/2020 | Salem | G06F 21/54 |
| 10,795,659 | B1* | 10/2020 | Kinsburskiy | G06F 8/65 |
| 11,144,438 | B1* | 10/2021 | Teixeira | G06F 8/658 |
| 2012/0167057 | A1* | 6/2012 | Schmich | G06F 11/3644 717/130 |
| 2015/0169321 | A1* | 6/2015 | Rissell | G06F 8/70 717/121 |
| 2015/0227405 | A1* | 8/2015 | Jan | G06F 11/0778 714/37 |
| 2015/0234736 | A1* | 8/2015 | Koju | G06F 11/3692 717/131 |
| 2016/0274990 | A1* | 9/2016 | Addleman | G06F 11/3452 |
| 2016/0292057 | A1* | 10/2016 | Segger | G06F 11/3013 |
| 2017/0103221 | A1* | 4/2017 | Goel | G06F 11/3636 |
| 2018/0032731 | A1* | 2/2018 | De | G06F 21/53 |
| 2018/0181482 | A1* | 6/2018 | Cattan | G06F 11/302 |
| 2018/0225096 | A1* | 8/2018 | Mishra | G06F 8/75 |
| 2018/0268130 | A1* | 9/2018 | Ghosh | G06F 21/53 |
| 2019/0121719 | A1* | 4/2019 | Hamon | G06F 11/0769 |
| 2019/0196937 | A1* | 6/2019 | Wang | G06F 11/3419 |
| 2019/0324882 | A1* | 10/2019 | Borello | G06F 21/57 |
| 2019/0340103 | A1* | 11/2019 | Nelson | G06F 11/3636 |
| 2020/0160458 | A1* | 5/2020 | Bodin | G06F 8/33 |
| 2020/0272553 | A1* | 8/2020 | Miloiu | G06F 11/3664 |
| 2021/0026949 | A1* | 1/2021 | Korotaev | G06F 8/658 |
| 2021/0263833 | A1* | 8/2021 | Reisner | G06F 11/3624 |
| 2022/0050704 | A1* | 2/2022 | Moore | G06F 9/461 |

OTHER PUBLICATIONS

Chi-Wei Wang, ProbeBuilder: Uncovering Opaque Kernel Data Structures for Automatic Probe Construction, 2016, pp. 568-580. https://ieeexplore.ieee.org/stamp/stamp.jsp?tp=&arnumber=7069236 (Year: 2016).*

Meghana D K, Cloud-Based Approach to Increase the Performance of Execution of Binary by Using the Separate Debug, 2016, pp. 743-746. https://ieeexplore.ieee.org/stamp/stamp.jsp?tp=&arnumber=7912098 (Year: 2016).*

Micahel Kerrisk, "ERROR::BUILDID(7stap)", Linux and UNIX programming training, Nov. 19, 2019 (2 pages).

Vincent Bernat, "Live Patching QEMU for VENOM mitigation", SUSE, May 27, 2015 (15 pages).

Aaron Merey, "Introducing debuginfod, the elfutils debuginfo server", Red Hat Developer, Oct. 14, 2019 (10 pages).

"Live Patching with SUSE Manager", SUSE, Jun. 30, 2020 (7 pages).

"Build-Id Unique Identification of Binaries", Red Hat, Jun. 30, 2020 (2 pages).

* cited by examiner

PATHNAME INDEPENDENT PROBING OF BINARIES

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device or multiple computing devices. Live patches and/or modifications may often be applied in various server or cloud environments which may be continuously evolving.

SUMMARY

The present disclosure provides new and innovative systems and methods for creating probing applications and probing executable binaries. In an example, a system, includes a memory and one or more processors that are in communication with the memory. The processor is configured to receive a task to probe a portion of the memory associated with a version of a binary file during execution of the binary file, where the task includes a portion of object code associated with the version of the binary file and a hash identifier associated with the version of the binary file. A database mapping hash identifiers to debug information associated with installed binary files is accessed, where each version of an installed binary file has associated debug information. Debug information is retrieved from a database, where the debug information is for the version of the binary file associated with the hash identifier. Next, a probing application is built using the debug information and the portion of object code, where upon execution of the version of the binary file, the probing application places the object code into the portion of the memory associated with the version of the binary file during the execution of the version of the binary file.

In an example, a method includes receiving a task to probe a portion of a memory associated with a version of a binary file during execution of the binary file, where the task includes a portion of object code associated with the version of the binary file and a hash identifier associated with the version of the binary file. Accessing a database mapping hash identifiers to debug information associated with installed binary files, where each version of an installed binary file has associated debug information. Retrieving, via the database, debug information for the version of the binary file associated with the hash identifier. Building a probing application, using the debug information, including the portion of object code, wherein upon execution of the version of the binary file, the probing application places the object code into the portion of the memory associated with the version of the binary file during the execution of the version of the binary file.

In an example, a system includes a memory and one or more processors in communication with the memory. The system also includes an operating system to execute on the or more processors, where the one or more processors are configured to monitor system calls of the operating system for a system call executing a binary file, where the binary file is associated with a build identifier. Upon execution of the binary file, a portion of the memory associated with the execution of the binary file is decoded to determine whether the binary file is associated with the build identifier. Upon determining the execution of the binary file corresponds to the build identifier, a portion of object code is loaded into the portion of the memory associated with the binary file, where the portion of object code modifies a functionality of the binary file during execution.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
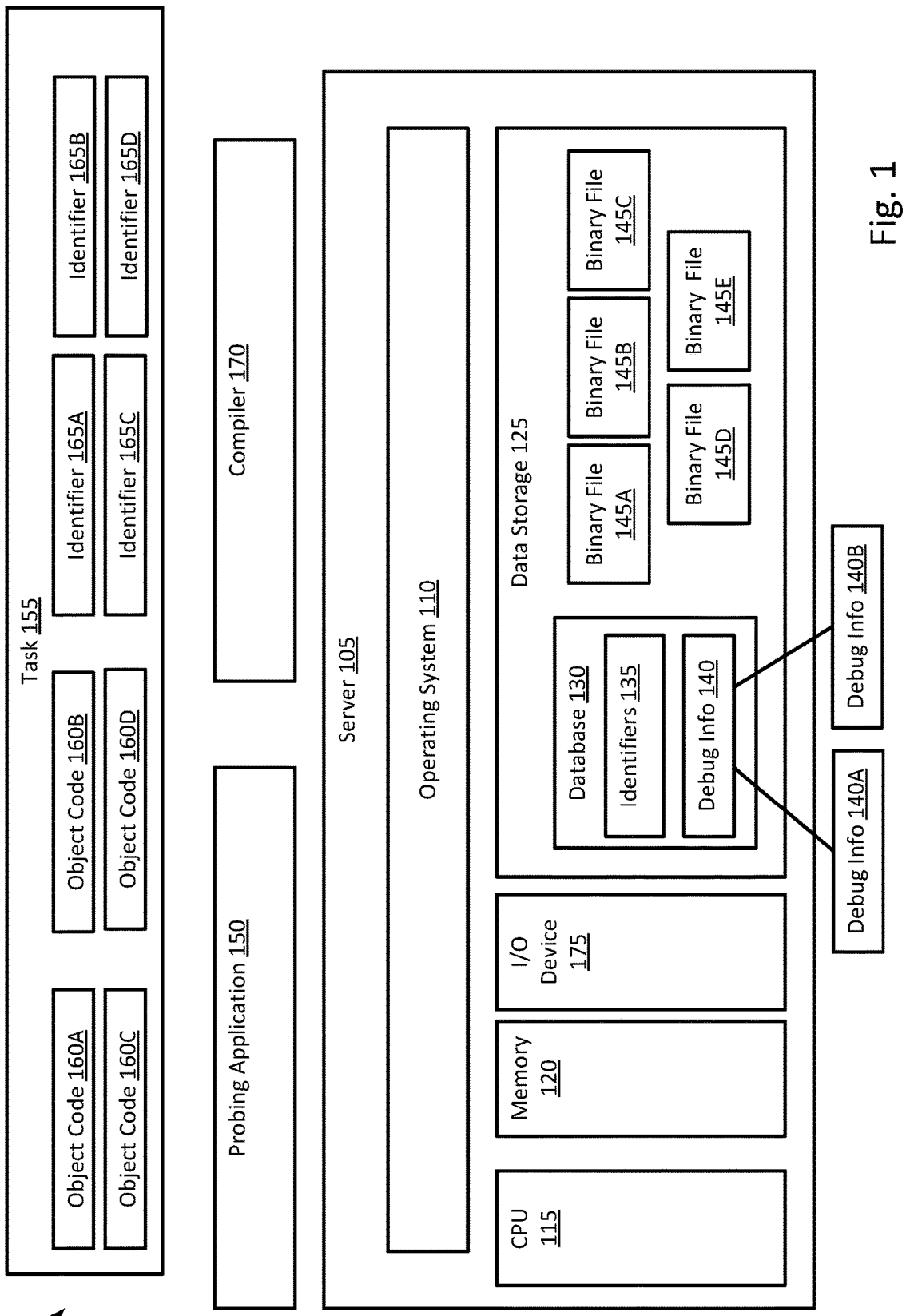
FIG. 1 illustrates a high level component diagram of an example computing system in accordance with one or more aspects of the present disclosure.

Techniques are disclosed for implementing systems and methods for creating a probing application and probing a binary (e.g., applications and services executed on a computer system; shared libraries loaded into memory) independent of using a pathname and/or location of the binary. Typically, when applying runtime instrumentation (i.e., security-related live patches to a program), determining or predicting every name and/or installation location of an application, service, and/or shared library within a server can be difficult. In various instances, a single version of an application, service, and/or shared library may be installed multiple times throughout a system. In other instances, multiple versions of an application, service, or shared library may be installed in various locations through a system. In some instances, an application, service, or shared library may be running inside containers with artificial namespace path names.

As described in various examples disclosed herein, to advance the use of live patching systems, the systems and methods disclosed herein advantageously analyzes a computer system (e.g., a server) to create an application that addresses live patching and/or probing based on whether a binary is executed on a system, rather than knowing a name or location of the binary. In various examples, a probing application may be built and run to live patch and/or probe applications, services, and/or shared libraries installed on a computer system (e.g., traditional object code, Go code built with Openshift, Java object built with Graal and/or Quarkus). In certain examples, a compiler (e.g. systemtap) may receive a task and/or information related to one or more applications, services, and/or shared libraries installed on a computer system. In most instances, the information includes build identifiers related to versions of an application, service, and/or shared library. For example, each application, service, or shared library created includes a build identifier indicating a version of the application, service, or shared library. In various instances, a build identifier may be used to identify a single build or a whole history of builds of an application, service, and/or shared library, which may be used to identify a set of builds of an application, service, and/or shared library. For example, identifiers "3.1.2", "3.1.1", "3.1.2.5", and "3.1.4" could describe four different versions of an application. However, the same application with the same identifiers may also use the identifier "3.1" to identify each version of an application that has an identifier that starts with "3.1" (i.e., "3.1.2", "3.1.1", "3.1.2.5", and "3.1.4").

A compiler is operable to look up binaries associated with each build identifier of interest. In various instances, a compiler may use the file system and/or other tools (e.g., elfutils debuginfod network service) to determine whether an application, service, and/or shared library is located on a computer system. In some instances, when a specific version of a binary is not installed on a system, the compiler may download a private copy of the binary to process debug information for each version of the binary. In some instances, a compiler may prompt debuginfod to obtain a private copy of an executable and its debug information for each of the versions that may be downloaded and processed. Using the build identifier and debug information, a compiler may build a probing application that may be able to probe each of the binaries identified by build identifiers. Debug information may include debugging artifacts, source code, application programming interface definitions and/or other information that facilitates interfacing with an application, service, and/or a shared library. In certain examples, a build identifier may be associated with one or more portions of object code operable to modify a functionality of one or more versions of a binary installed on a computer system. A combination of build identifiers and associated object code may be implemented into a single probing application operable to probe and/or live patch each of identified application, service, and/or shared library as they are executed and/or loaded into memory. In various examples, live patches and/or instrumentation may include security related patches, debugging instrumentations, and/or fixes to functionality of an application, service, and/or shared library.

At runtime, a probing application is operable to monitor the computer system to detect when any binaries with the build identifiers of interest are launched. In these instances, the probing application intercepts each exec and/or mmap system call to determine when an application, service, and/or shared library is started and/or loaded into memory. In most instances, a probing application may check the memory associated with each binary and/or shared library loaded into memory and determines whether the build identifier matches probes and/or live patches included in the probing application. As each executable and/or shared library is loaded into memory or executed, they are each tested for a match by comparing the recorded build identifier against the actual data in the process address space. In most instances, detection of applications, services, and/or shared libraries are not done by file name, so that the same binary hiding inside other constructs (e.g., a container and/or other virtual devices) may be identified. When the probing application detects an application, service, and/or shared library of interest, the probing application inserts probes and/or instrumentation into memory associated with the executing binary and/or shared library to modify the functionality of the binary and/or the shared library. Once a probing application has completed probing an application, service, and/or shared library, the probing application removes the probes and/or instrumentation, thereby reverting the application, service, and/or shared library to its original state. In certain instances, the probing application may be removed when the application, service, and/or shared library has finished executing and is being removed from memory.

FIG. 1 depicts a high-level component diagram of an example computing system 100 in accordance with one or more aspects of the present disclosure. The computing system 100 may include a server 105 interacting with a probing application 150 and a compiler 170. As shown in FIG. 1, server 105 includes operating system 110, CPU 115, memory 120, I/O device 175, and data storage 125. Database 130 and binary files 145A-E are stored and/or installed on the data storage 125 within server 105. Within database 130, identifiers 135 are mapped to debug information 140, where both the identifiers 135 and debug information 140 is associated with at least one of the binary files 145A-E. In some instances, a binary file 145A-E may be installed multiple times on the server 105, and as such there may be a single debug info (e.g., 140B) that is associated with two different binary files (e.g., binary files 145B, 145C). Debug information 140 represents all debug information for each application installed on the server 105, whereas debug information 140A and 140B correspond to specific versions of an application installed on the server 105. For example, an application installed on the server 105 may correspond to binary file 145A and binary file 145B, where binary file 145A is version 1 of the application and binary file 145B is version 2 of the application. In this example, debug info 140A corresponds to binary file 145A and debug info 140B corresponds to binary file 145B. Upon querying the database 130, a determination can be made as to whether an application is installed on the server 105. Additionally, whether or not a specific version of the application is installed from information in the database 130. In various examples, each of the identifiers 135 corresponds to a version of an application installed on the server 105. Further, the debug information 140 stored within the database 130 includes information (e.g., debug info 140A/140B) that is associated with each of the identifiers 135 and each of the binary files 145A-E.

In an example, the probing application 150 may be developed to work with various applications, services, or shared libraries executing and/or loaded into memory 120 on the server 105. In this instance, the applications, services, and/or shared libraries that are accessible from the server 105 may be represented by binary files 145A-E. In another example, one or more of the binary files 145A-E may be different versions of the same application, service, and/or shared library. In some examples, one or more of the binary files 145A-E may be different installations of the same application, service, and/or shared library installed on the server 105. In various instances, the compiler 170 may be operable to build the probing application 150 using the task 155 and information from the server 105. As shown in FIG. 1, the probing application 150 may be operable to implement and/or load object code 160A-D into memory 120 during runtime of one or more of the binary files 145A-E to modify a functionality of one or more of the binary files 145A-E.

Compiler 170 may be a dynamic translator. In an example, compiler 170 may be a Systemtap interpreter. The compiler 170 may be operable to create probing application 150 using information from task 155. In various instances, task 155 may include identifiers 165A-D and object code 160A-D. Identifiers 165A-D may indicate which build and/or which version of an application are associated with object code 160A-D. For example, in one instance, identifier 165A may be associated with object code 160A and binary file 145A. When building the probing application 150 to interact with binary file 145A, the compiler 170 queries the database 130 using the identifier 165A to retrieve debug information 140A related to the binary file 145A. In this example, the compiler 170 takes and uses the information from debug info 140A (e.g., interface information, location of memory space, and/or other relevant installation information related to the application) to incorporate the object code 160A associated with the binary file 145A in the probing application 150 such that the probing application 150 may be operable to modify a functionality of binary file 145A during runtime. In an example, the compiler 170 may be a program running on a processor (e.g., CPU 115). In some examples, CPU 115, memory 120 and data storage 120 may be physical hardware.

As used herein, physical processor or processor 115 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 120 refers to a volatile or non-volatile memory device, such as RAM, ROM, EEPROM, or any other device capable of storing data. As discussed herein, I/O device 175 refers to a device capable of providing an interface between one or more processor pins and an external device capable of inputting and/or outputting binary data.

Processor (e.g., CPU 115) may represent one or more processors. These processors may be interconnected using a variety of techniques, ranging from a point-to-point processor interconnect, to a system area network, such as an Ethernet-based network. Local connections within each node, including the connections between a processor 115 and a memory device 120 may be provided by one or more local buses of suitable architecture, for example, peripheral component interconnect (PCI).

Figure 2:
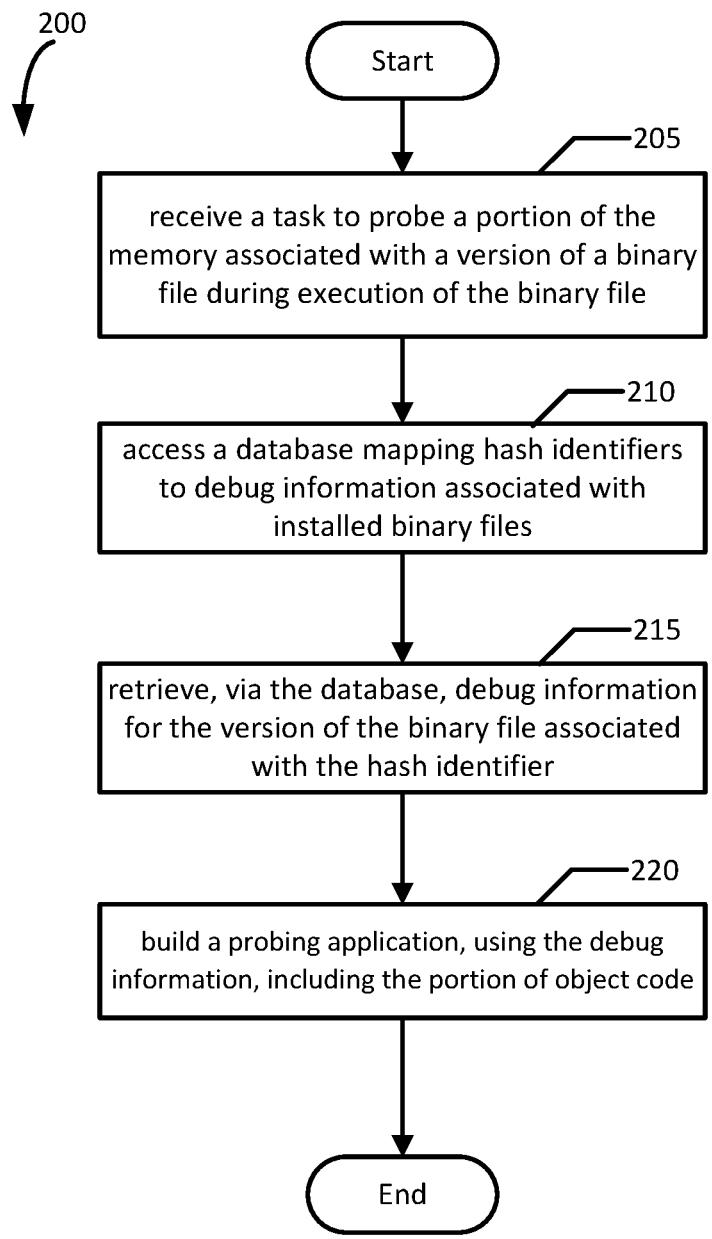
FIG. 2 illustrates a flowchart of an example method for creating a probing application according to an example embodiment of the present disclosure.

FIG. 2 illustrates a flowchart of an example method for creating a probing application, in accordance with an embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated and some of the blocks described are optional. The method 200 may be performed by processing logic that may comprise hardware (circuitry, dedicated logic, etc.), software, or a combination of both.

In this example, the method 200 may begin a server receiving a task to probe a portion of the memory associated with a version of a binary file during execution of the binary file (block 205). For example, server 105 receives task 155 which is requesting to probe an application or service installed on the server 105. The task includes identifiers 165A-D (e.g., a hash identifier) and a portion of object code 160A-D where each correspond to a version of a binary file (e.g., binary files 145A-E). The server 105 sends the task 155 to the compiler 170 to initiate the process of creating the probing application 150. Next, the example method 200 includes the compiler accessing a database mapping hash identifiers to debug information associated with installed binary files (block 210). For example, the compiler 170 accesses the database 130, which includes a mapping identifiers 135 to debug info 140. Each version of an installed binary file (e.g., binary files 145A-E) has an associated debug information 140. The debug info 140 includes information that may be useful when building a probing application 150 to interface with a binary file 145A-E installed on the server 105. The debug info 140 may include debugging information, debugging artifacts readable by debuggers, and/or source code associated with the original application. In various instances, a compiler 170 may need access to original source code of an installed application (e.g., binary file 145A) to create a probing application 150 to interface with the installed application.

Next, the example method 200 includes a compiler retrieving, via the database, debug information for the version of the binary file associated with the hash identifier (block 215). For example, the compiler 170 queries the database 130 for debug information 140 associated with each of the identifiers 165A-D and retrieves the debug information 140 for use in building the probing application 150. In one example, identifier 165A correspond to binary file 145A, debug info 140A, and object code 160A. Next, the example method 200 includes the compiler building a probing application using the debug information, including the portion of object code (block 220). Upon execution of a version of the binary file (e.g., binary files 145A-E), the probing application 150 is operable to place object code into a portion of memory associated with a version of the binary file 145A-E during the execution of the version of the binary file 145A-E. For example, the compiler 170 parses the debug info 140A to obtain a location of original source of the binary file 145A. The compiler 170 analyzes the original source code of the binary file 145A to determine where in memory 120 and how to implement the object code 160A when building the probing application 150. The probing application 150 is configured to load the object code 160A into memory 120 associated with binary file 145A during runtime to modify a functionality of the binary file 145A.

Figure 3:
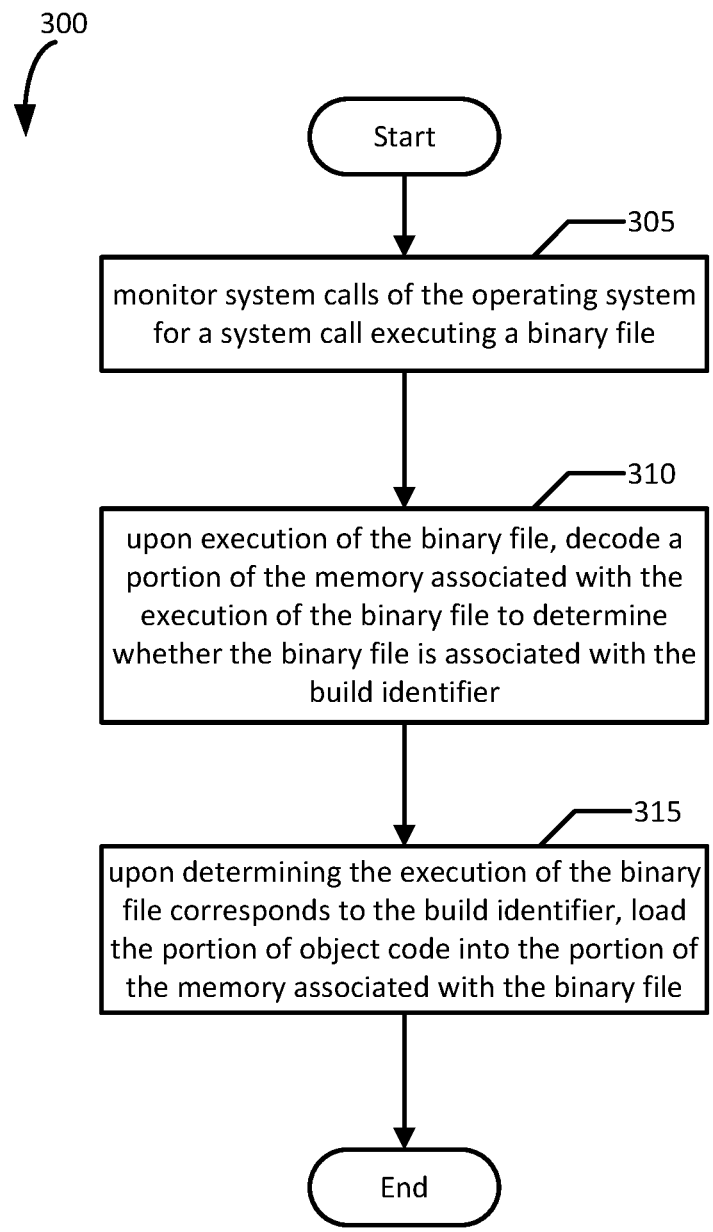
FIG. 3 illustrates a flowchart of an example method for probing an application, in accordance with an embodiment of the present disclosure.

FIG. 3 illustrates a flowchart of an example method for probing an application, in accordance with an embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated and some of the blocks described are optional. The method 300 may be performed by processing logic that may comprise hardware (circuitry, dedicated logic, etc.), software, or a combination of both.

In this example, the method 300 includes a probing application monitoring system calls of the operating system for a system call executing a binary file (block 305). For example, the probing application 150 is operable to monitor the operating system 110 on the server 105 for systems calls that either execute a binary file and/or map a shared library into memory 120, where each binary file is associated with a build identifier 165A-D. In one example, the probing application 150 intercepts system calls to the operating system 110 that are execution or memory mapping system calls associated with binary file 145A, which is associated with identifier 165A, debug info 140A, and object code 160A. The example method 300 includes a probing application, upon execution of the binary file, decoding a portion of the memory associated with the execution of the binary file to determine whether the binary file is associated with the build identifier (block 310). For example, when binary file 145A starts executing within memory 120 of the server 105, the probing application 150 detects the system calls to the operating system 110 initializing server 105 in preparation to execute binary file 145A. Once the binary file 145A is loaded into memory 120, the probing application 150 decodes a portion of the memory 120 associated with the executing binary file 145A to determine whether the executing binary file is associated with identifier 165A. In these instances, the decoded portion of the memory 120 includes the identifier 165A or a hash of the identifier 165A, which indicates that the application and/or service running in memory is associated with binary file 145A.

In the example method 300 includes the probing application, upon determining the execution of the binary file corresponds to the build identifier, loading the portion of object code into the portion of the memory associated with the binary file (block 315). For example, upon determining that the binary file 145A is executing and also is associated with the identifier 165A, the probing application 150 loads the object code 160A into the portion of memory 120 associated with the executing binary file 145A. The object code 160A loaded into the portion of memory 120 modifies the functionality of the binary file 145A during execution. In some instances, the object code 160A adds various types of instrumentation (e.g., debug statements, fixes bugs, and/or modifies functionality as needed during runtime). In other examples, instances of instrumentation may perform measurements, resource utilization measurements, variable/expression value monitoring, self-tuning, invariant checking, error detection, fault injection, and/or other functionality.

Figure 4:
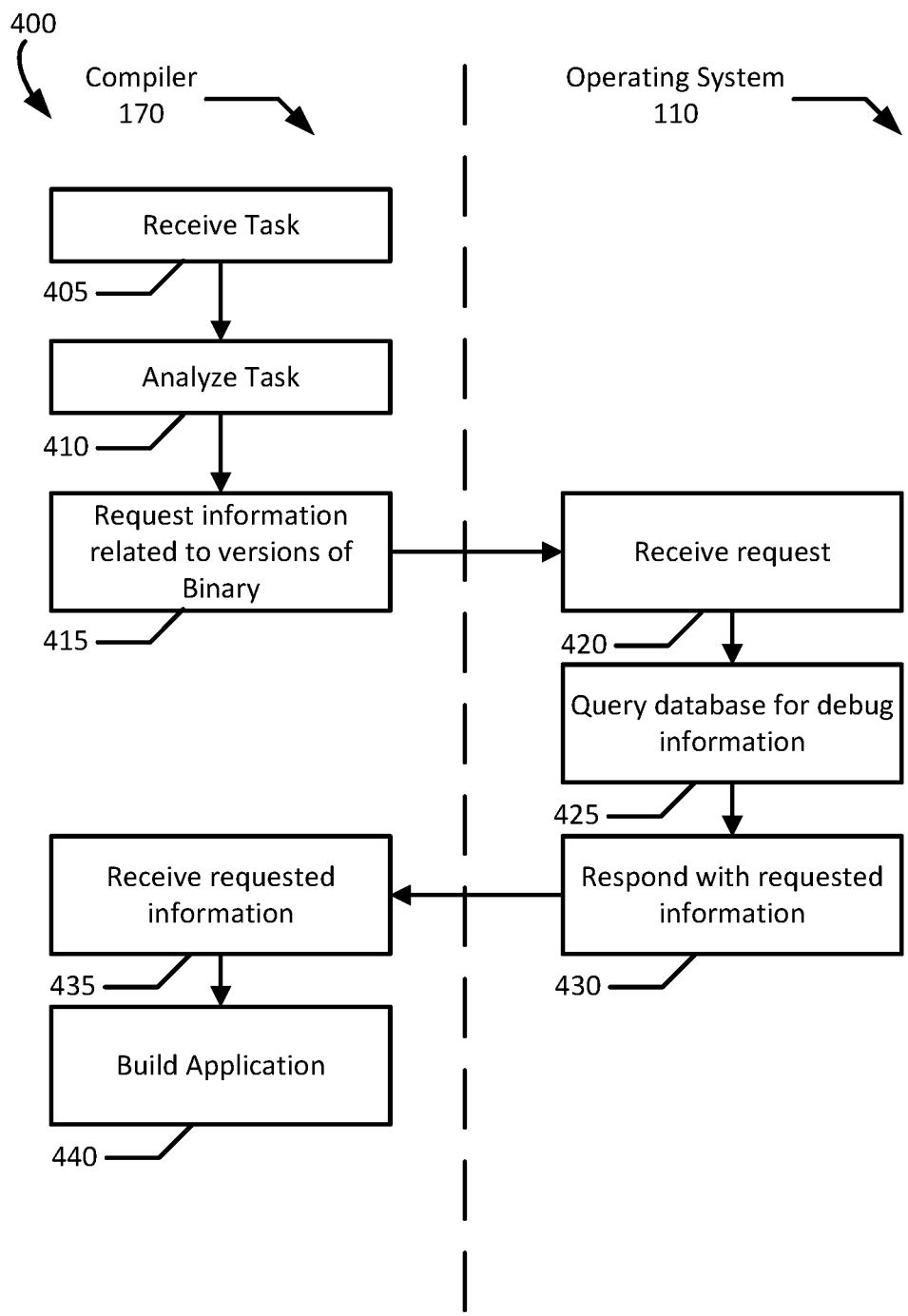
FIG. 4 illustrates a flow diagram of an example method of building a probing application using debug information, in accordance with an embodiment of the present disclosure.

FIG. 4 illustrates a flow diagram of an example method of building a probing application using debug information, in accordance with an embodiment of the present disclosure. Although the example method 400 is described with reference to the flow diagram illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. For example, in the illustrated flow diagram, a server 105 utilizes a compiler 170 to build a probing application 150 using debug info 140A.

As shown in FIG. 4, the compiler 170 receives the task 155 (block 405). In this instance, task 155 includes identifiers 165A-D and object code 160A-D, which indicates that the task 155 has identified four applications and/or services installed on server 105 which are to be probed and/or patched to modify the functionality of the respective application and/or service. The compiler 170 analyzes the task 155 to determine which applications and/or services are probed and/or patched (block 410). The compiler 170 requests information related to versions of binaries from the operating system 110 (block 415). Upon receiving the request at the operating system 110 (block 420), the operating system queries the database 130 for debug information related to identifiers in task 155 (block 425). In this instance, identifiers 165A-D, which indicate which binary files of binary files 145A-D are to be probed. In various instances, different binary files (e.g., binary file 145A and binary file 145B) may be different applications, services, and/or shared libraries installed on the server 105. In other instances, different binary files (e.g., binary file 145C and binary file 145D) may be different versions of the same application, service, and/or shared library installed on the server 105. In many instances, the debug information 140 may include a build identifier, installation location, and/or other tools and information required for accessing the respective application and/or service during execution. The debug information 140 may include source code and/or application programming interface information related to an application (e.g., binary file 145A-E). In various examples, a compiler 170 may analyze debug information 140 of an application (e.g., binary files 145A-E) to determine how to interface with the application and/or which portions of memory 120 to modify during runtime of the application.

As shown in FIG. 4, the operating system 110 retrieves the debug information 140 and responds to the compiler 170 with the requested information (block 430). The compiler 170 receives the requested information (block 435) and builds the probing application 150 (block 440). In one example, a compiler 170 parses debug info 140A, which is associated with binary file 145A, to retrieve a location of source code for the binary file 145A and definitions for an application programming interface for the binary file 145A. The compiler 170 incorporates some of the information retrieved form the debug info 140A and the object code 160A to build the probing application 150. The resulting probing application 150 is operable to intercept system calls (e.g., exec and mmap) indicating that an application, service, and/or shared library associated with binary file 145A is being started in the server 105 (e.g., binary files 145A-E) and modify a functionality of the binary file 145A according to the object code 160A. In some instances, the task 155 may include source code instead of object code 160A. In other instances, the task 155 may include a combination of source code and object code 160A operable to modify a functionality of an application.

Figure 5:
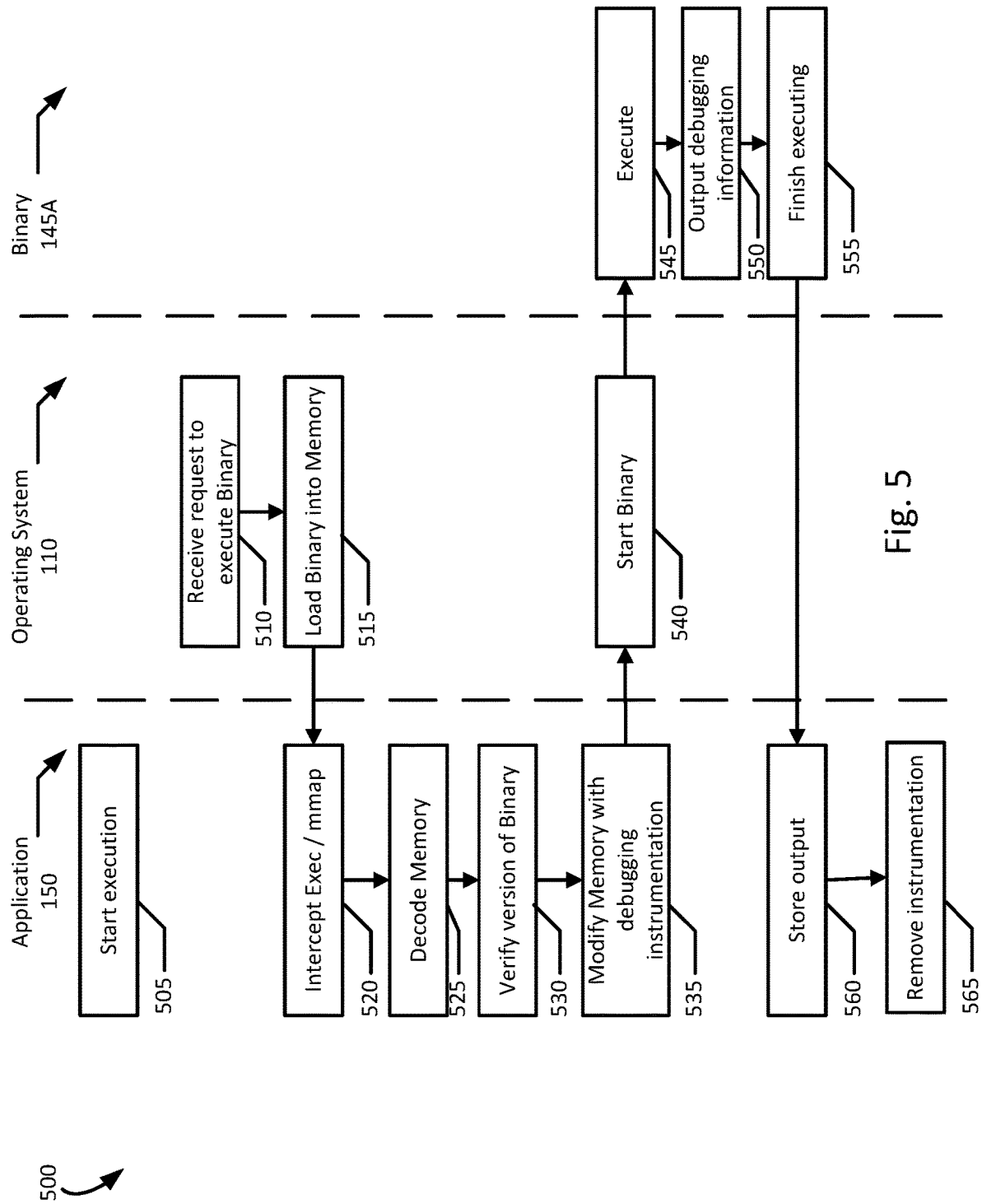
FIG. 5 illustrates a flow diagram of an example method of probing an application installed on a server, in accordance with an embodiment of the present disclosure.

FIG. 5 illustrates a flow diagram of an example method of probing an application installed on a server, in accordance with an embodiment of the present disclosure. Although the example method 500 is described with reference to the flow diagram illustrated in FIG. 5, it will be appreciated that many other methods of performing the acts associated with the method 500 may be used. For example, the order of some of the blocks may be changed, certain blocks may be combined with other blocks, blocks may be repeated, and some of the blocks described are optional. For example, in the illustrated flow diagram, a probing application 150 executes on a server 105 to probe and/or modify functionality of a binary file 145A during execution on the server 105.

As shown in FIG. 5, the probing application 150 is executed on server 150 (block 505). The probing application 150 is operable to load object code 160A, which is associated with binary file 145A and identifier 165A, to probe and/or modify a functionality of the binary file 145A during runtime. The operating system 110 receives a request to execute binary 145A (block 510). The operating system 110 loads the binary file 145A into memory 120 (block 515). The probing application 150 intercepts the system call loading the binary file 145A into memory 120 (block 520). Next, the probing application 150 decodes a portion of memory 120 associated with the binary file 145A to read data stored in the portion of memory 120 (block 525). The probing application 150 verifies that the binary file 145A (e.g., executing in memory 120) corresponds to identifier 165A (block 530). Next, the probing application 150 modifies the memory 120 associated with the binary file 145A with object code 160A which includes debugging instrumentation (block 535). For example, object code 160A may incorporate commands that output debugging information at different times during runtime of the binary file 145A (e.g., during startup, shutdown, and/or during execution of specific functionality).

Next, the operating system 110 starts the binary file 145A loaded into memory 120 (block 540). Upon being started by the operating system 110, the binary file 145A starts executing within memory 120 of the server 105 (block 545). During execution of the binary file 145A, the object code 160A is executed and causes the binary file 145A to output debugging information (block 550). For example, a modified binary file 145A may output various variable values at different points during execution. In other instances, a modified binary file 145A may output a state of the binary file 145 during specific points in time during execution. Once the binary file 145A has finished executing (block 555), the probing application 150 stores the output received from the debugging instrumentation (block 560). In some instances, the probing application 150 may continually store debugging information during runtime of the binary file 145A. In other instances, the debug instrumentation within the binary file 145A may write output to memory 120 and/or directly to data storage 125 during runtime. As shown in FIG. 5, once the output is stored, the probing application 150 removes the debugging instrumentation from the memory 120 associated with the binary file 145A.

Figure 6:
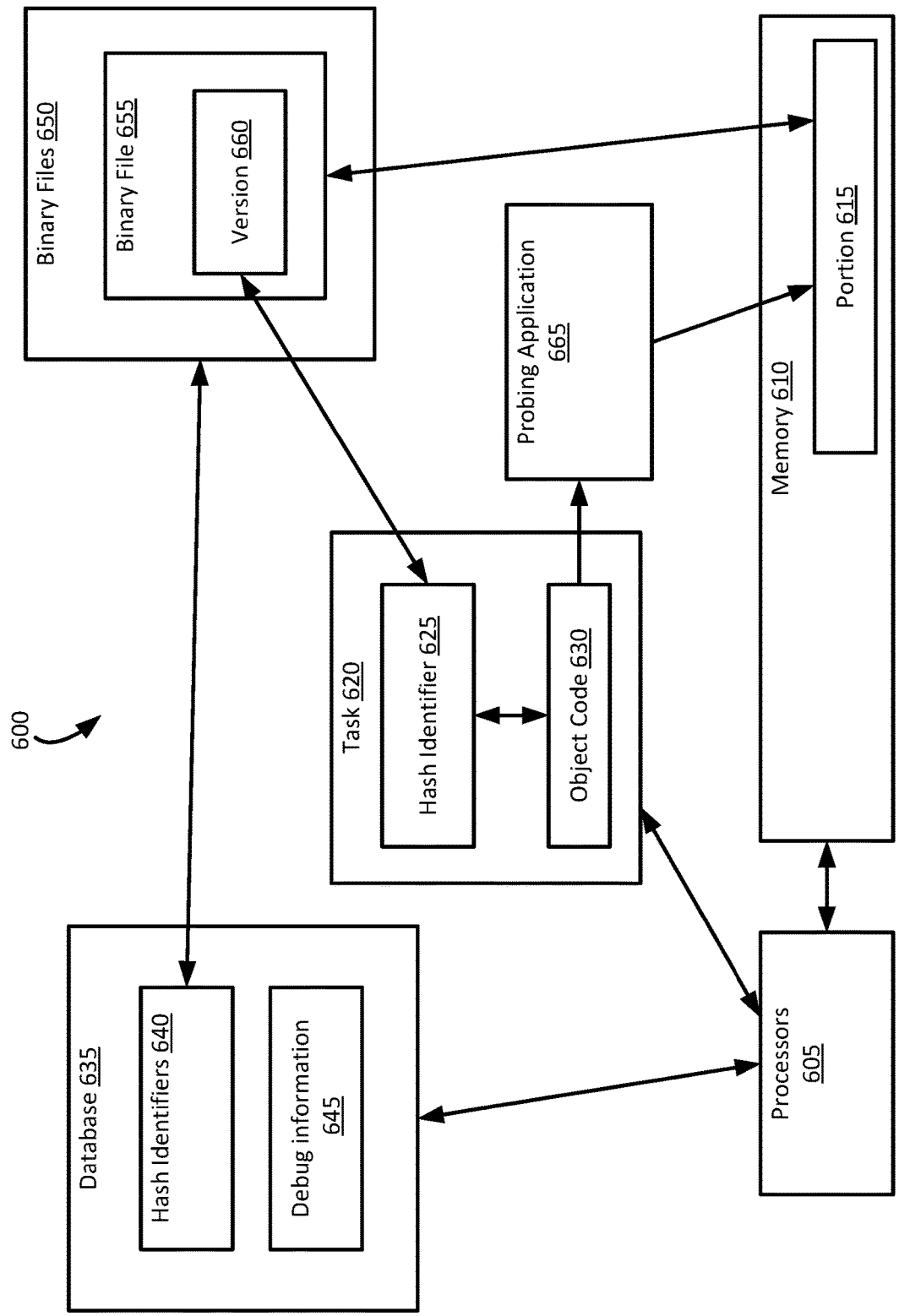
FIG. 6 illustrates a block diagram of an example system creating a probing application to probe an application during runtime, according to an example embodiment of the present disclosure.

FIG. 6 is a block diagram of system 600, which includes memory 610 and processor 605. The processor 605 is in communication with the memory 610. The processor 605 is configured to receive a task 620 to probe a portion 615 of the memory 610 associated with a version 660 of the binary file 655 during execution of the binary file 655. The task 620 includes a portion of object code 630 associated with the version 660 of the binary file 655 and a hash identifier 640 associated with the version 660 of the binary file 655. A database 635 mapping hash identifiers 640 to debug information 645 associated with installed binary files 650 is accessed. In this instance, each version 660 of an installed binary file 655 has associated debug information 645. The debug information 645 is retrieved from the database 635 for the version 660 of the binary file 655 associated with the hash identifier 640. Next, a probing application 665 is built using the debug information 645 and including the portion of object code 630. Upon execution of the version 660 of the binary file 655, the probing application 665 places the object code 630 into the portion 615 of memory 610 associated with the version 660 of the binary file 655 during the execution of the version 660 of the binary file 655.

Figure 7:
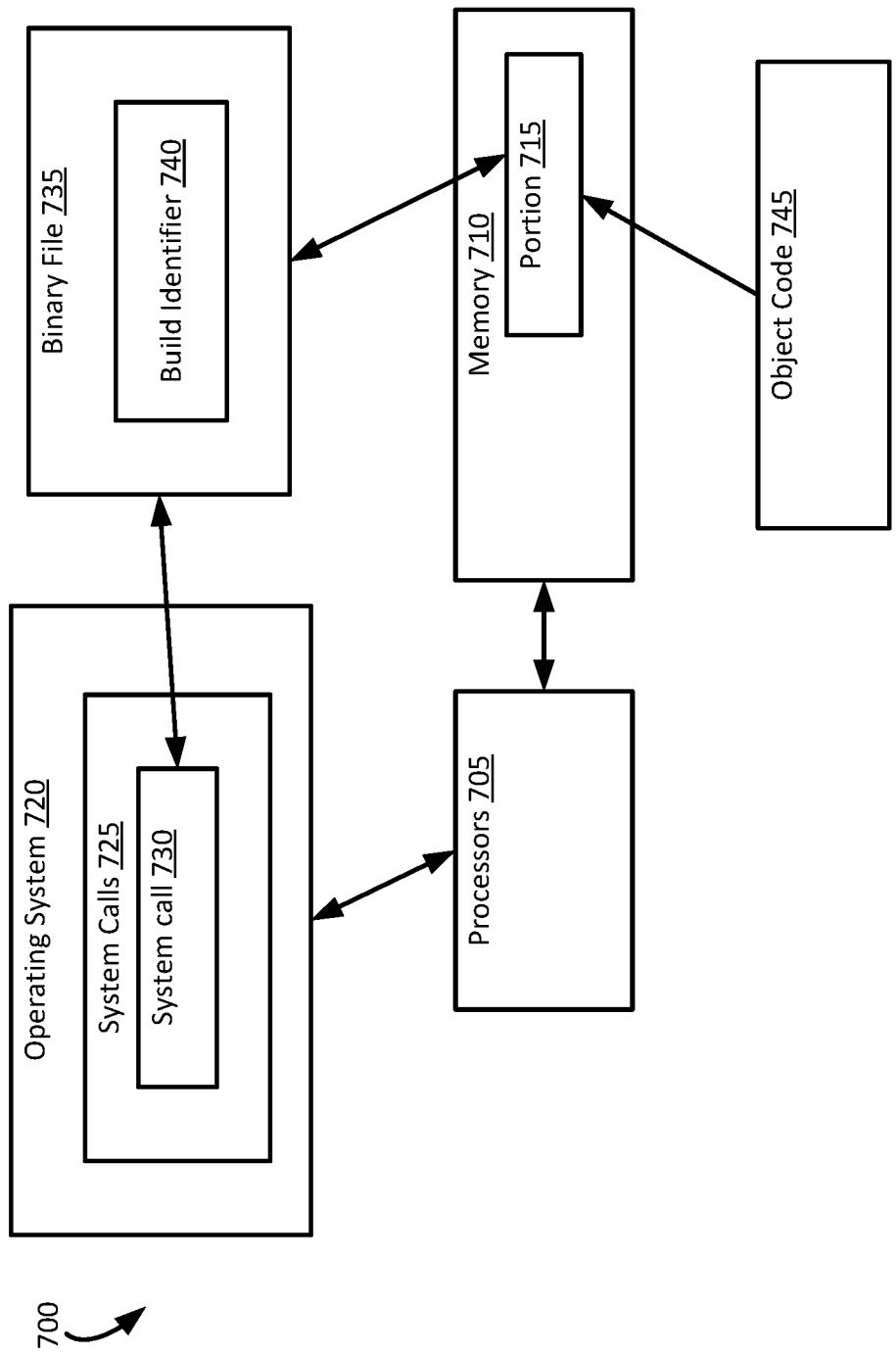
FIG. 7 illustrates a block diagram of an example system probing an application during runtime, according to an example embodiment of the present disclosure

FIG. 7 is a block diagram of system 700, which includes memory 710 and processor 705. The processor 705 is in communication with the memory 710 and an operating system 720 is executing on the one or more processors 705. The processor 705 is configured to monitor system calls 725 of the operating system 720 for a system call 730 executing a binary file 735, where the binary file 735 is associated with a build identifier 740. Upon execution of the binary file 735, a portion 715 of memory 710 associated with the execution of the binary file 735 is decoded to determine whether the binary file 735 is associated with the build identifier 740. Upon determining the execution of the binary file 735 corresponds to the build identifier 740, a portion of object code 745 is loaded into the portion 715 of memory 710 associated with the binary file 735, where the portion of object code 745 modifies a functionality of the binary file 735 during execution.

Aspects of the subject matter described herein may be useful alone or in combination with one or more aspects described herein. In a 1st exemplary aspect of the present disclosure, a system, comprising: a memory; and one or more processors in communication with the memory, wherein the processor is configured to: receive a task to probe a portion of the memory associated with a version of a binary file during execution of the binary file, wherein the task includes a portion of object code associated with the version of the binary file and a hash identifier associated with the version of the binary file; access a database mapping hash identifiers to debug information associated with installed binary files, wherein each version of an installed binary file has associated debug information; retrieve, via the database, debug information for the version of the binary file associated with the hash identifier; and build a probing application, using the debug information, including the portion of object code, wherein upon execution of the version of the binary file, the probing application places the object code into the portion of the memory associated with the version of the binary file during the execution of the version of the binary file.

In a 2nd exemplary aspect of the present disclosure, which may be used in combination with any one or more of the preceding aspects (i.e., the 1st aspect), the system further includes where the debug information includes source code of the version of the binary file associated with the hash identifier.

In a 3rd exemplary aspect of the present disclosure, which may be used in combination with any one or more of the preceding aspects (i.e., the 1st aspect), the system further includes where the debug information includes debugging tools for debugging the version of the binary file associated with the hash identifier.

In a 4th exemplary aspect of the present disclosure, which may be used in combination with any one or more of the preceding aspects (i.e., the 1st aspect), where retrieving further comprises: upon determining that the version of the binary file associated with the hash identifier is not installed, installing the version of the binary file associated with the hash identifier; and after the binary file is installed, attempting to retrieve the debug information of the binary file associated with the hash identifier.

In a 5th exemplary aspect of the present disclosure, which may be used in combination with any one or more of the preceding aspects (i.e., the 1st aspect), where building the probing application further comprises: modifying the portion of object code using the debug information retrieved from the database.

In a 6th exemplary aspect of the present disclosure, which may be used in combination with any one or more of the preceding aspects (i.e., the 1st aspect), the system further includes where the portion of object code outputs debugging information from the binary file during runtime.

In a 7th exemplary aspect of the present disclosure, which may be used in combination with any one or more of the preceding aspects (i.e., the 1st aspect), the system further includes where the portion of object code patches a bug during runtime of the binary file.

Aspects of the subject matter described herein may be useful alone or in combination with one or more aspects described herein. In an 8th exemplary aspect of the present disclosure, a method, comprising receiving a task to probe a portion of a memory associated with a version of a binary file during execution of the binary file, wherein the task includes a portion of object code associated with the version of the binary file and a hash identifier associated with the version of the binary file; accessing a database mapping hash identifiers to debug information associated with installed binary files, wherein each version of an installed binary file has associated debug information; retrieving, via the database, debug information for the version of the binary file associated with the hash identifier; and building a probing application, using the debug information, including the portion of object code, wherein upon execution of the version of the binary file, the probing application places the object code into the portion of the memory associated with the version of the binary file during the execution of the version of the binary file.

In a 9th exemplary aspect of the present disclosure, which may be used in combination with any one or more of the preceding aspects (i.e., the 8th aspect), where the debug information includes source code of the version of the binary file associated with the hash identifier.

In a 10th exemplary aspect of the present disclosure, which may be used in combination with any one or more of the preceding aspects (i.e., the 8th aspect), where the debug information includes debugging tools for debugging the version of the binary file associated with the hash identifier.

In a 11th exemplary aspect of the present disclosure, which may be used in combination with any one or more of the preceding aspects (i.e., the 8th aspect), where retrieving further comprises: upon determining that the version of the binary file associated with the hash identifier is not installed, installing the version of the binary file associated with the hash identifier; and after the binary file is installed, attempting to retrieve the debug information of the binary file associated with the hash identifier.

In a 12th exemplary aspect of the present disclosure, which may be used in combination with any one or more of the preceding aspects (i.e., the 8th aspect), where building the probing application further comprises: modifying the portion of object code using the debug information retrieved from the database.

In a 13th exemplary aspect of the present disclosure, which may be used in combination with any one or more of the preceding aspects (i.e., the 8th aspect), where the portion of object code outputs debugging information from the binary file during runtime.

In a 14th exemplary aspect of the present disclosure, which may be used in combination with any one or more of the preceding aspects (i.e., the 8th aspect), where the portion of object code patches a bug during runtime of the binary file.

Aspects of the subject matter described herein may be useful alone or in combination with one or more aspects described herein. In an 15th exemplary aspect of the present disclosure, a non-transitory machine readable medium storing code, which when executed by a processor is configured to: receive a task to probe a portion of a memory associated with a version of a binary file during execution of the binary file, wherein the task includes a portion of object code associated with the version of the binary file and a hash identifier associated with the version of the binary file; access a database mapping hash identifiers to debug information associated with installed binary files, wherein each version of an installed binary file has associated debug information; retrieve, via the database, debug information for the version of the binary file associated with the hash identifier; and build a probing application, using the debug information, including the portion of object code, wherein upon execution of the version of the binary file, the probing application places the object code into the portion of the memory associated with the version of the binary file during the execution of the version of the binary file.

In a 16th exemplary aspect of the present disclosure, which may be used in combination with any one or more of the preceding aspects (i.e., the 15th aspect), where the debug information includes source code of the version of the binary file associated with the hash identifier.

In a 17th exemplary aspect of the present disclosure, which may be used in combination with any one or more of the preceding aspects (i.e., the 15th aspect), where the debug information includes debugging tools for debugging the version of the binary file associated with the hash identifier.

In a 18th exemplary aspect of the present disclosure, which may be used in combination with any one or more of the preceding aspects (i.e., the 15th aspect), where retrieving further comprises: upon determining that the version of the binary file associated with the hash identifier is not installed, installing the version of the binary file associated with the hash identifier; and after the binary file is installed, attempting to retrieve the debug information of the binary file associated with the hash identifier.

In a 19th exemplary aspect of the present disclosure, which may be used in combination with any one or more of the preceding aspects (i.e., the 15th aspect), where building the probing application further comprises: modifying the portion of object code using the debug information retrieved from the database.

In a 20th exemplary aspect of the present disclosure, which may be used in combination with any one or more of the preceding aspects (i.e., the 15th aspect), where the portion of object code outputs debugging information from the binary file during runtime.

In a 21st exemplary aspect of the present disclosure, which may be used in combination with any one or more of the preceding aspects (i.e., the 15th aspect), where the portion of object code patches a bug during runtime of the binary file.

Aspects of the subject matter described herein may be useful alone or in combination with one or more aspects described herein. In an 22nd exemplary aspect of the present disclosure, a system, comprising: a means for receiving a task to probe a portion of a memory associated with a version of a binary file during execution of the binary file, wherein the task includes a portion of object code associated with the version of the binary file and a hash identifier associated with the version of the binary file; a means for accessing a database mapping hash identifiers to debug information associated with installed binary files, wherein each version of an installed binary file has associated debug information; a means for retrieving, via the database, debug information for the version of the binary file associated with the hash identifier; and a means for build a probing application, using the debug information, including the portion of object code, wherein upon execution of the version of the binary file, the probing application places the object code into the portion of the memory associated with the version of the binary file during the execution of the version of the binary file.

Aspects of the subject matter described herein may be useful alone or in combination with one or more aspects described herein. In an 23rd exemplary aspect of the present disclosure, a system, comprising: a memory; one or more processors in communication with the memory; and an operating system to execute on the one or more processors, wherein the one or more processors are configured to: monitor system calls of the operating system for a system call executing a binary file, wherein the binary file is associated with a build identifier; upon execution of the binary file, decode a portion of the memory associated with the execution of the binary file to determine whether the binary file is associated with the build identifier; and upon determining the execution of the binary file corresponds to the build identifier, load a portion of object code into the portion of the memory associated with the binary file, wherein the portion of object code modifies a functionality of the binary file during execution.

In a 24th exemplary aspect of the present disclosure, which may be used in combination with any one or more of the preceding aspects (i.e., the 23rd aspect), where the system call is an exec command.

In a 25th exemplary aspect of the present disclosure, which may be used in combination with any one or more of the preceding aspects (i.e., the 23rd aspect), where the system call is a mmap command.

In a 26th exemplary aspect of the present disclosure, which may be used in combination with any one or more of the preceding aspects (i.e., the 23rd aspect), where the portion of object code attaches instrumentation to the binary file during runtime.

In a 27th exemplary aspect of the present disclosure, which may be used in combination with any one or more of the preceding aspects (i.e., the 26th aspect), where the instrumentation includes debugging tools.

In a 28th exemplary aspect of the present disclosure, which may be used in combination with any one or more of the preceding aspects (i.e., the 23rd aspect), where the one or more processors are further configured to: intercept a second system call executing a second binary file, wherein the second binary file is associated with a second build identifier; upon execution of the second binary file, decode a second portion of the memory associated with the execution of the second binary file to determine whether the second binary file is associated with the build identifier; upon determining the execution of the second binary file corresponds to the second build identifier, load a second portion of object code into the second portion of memory associated with the second binary file, wherein the second portion of object code modifies a functionality of the second binary file during execution.

Aspects of the subject matter described herein may be useful alone or in combination with one or more aspects described herein. In an 29th exemplary aspect of the present disclosure, a method, comprising: monitoring system calls of an operating system for a system call executing a binary file, wherein the binary file is associated with a build identifier; upon execution of the binary file, decoding a portion of the memory associated with the execution of the binary file to determine whether the binary file is associated with the build identifier; and upon determining the execution of the binary file corresponds to the build identifier, loading a portion of object code into the portion of the memory associated with the binary file, wherein the portion of object code modifies a functionality of the binary file during execution.

In a 30th exemplary aspect of the present disclosure, which may be used in combination with any one or more of the preceding aspects (i.e., the 29th aspect), where the system call is an exec command.

In a 31st exemplary aspect of the present disclosure, which may be used in combination with any one or more of the preceding aspects (i.e., the 29th aspect), where the system call is a mmap command.

In a 32nd exemplary aspect of the present disclosure, which may be used in combination with any one or more of the preceding aspects (i.e., the 29th aspect), where the portion of object code attaches instrumentation to the binary file during runtime.

In a 33rd exemplary aspect of the present disclosure, which may be used in combination with any one or more of the preceding aspects (i.e., the 32nd aspect), where the instrumentation includes debugging tools.

In a 34th exemplary aspect of the present disclosure, which may be used in combination with any one or more of the preceding aspects (i.e., the 29th aspect), where the method further comprises intercepting a second system call executing a second binary file, wherein the second binary file is associated with a second build identifier; upon execution of the second binary file, decoding a second portion of the memory associated with the execution of the second binary file to determine whether the second binary file is associated with the build identifier; and upon determining the execution of the second binary file corresponds to the second build identifier, loading a second portion of object code into the second portion of memory associated with the second binary file, wherein the second portion of object code modifies a functionality of the second binary file during execution.

Aspects of the subject matter described herein may be useful alone or in combination with one or more aspects described herein. In an 35th exemplary aspect of the present disclosure, a non-transitory machine readable medium storing code, which when executed by a processor is configured to: monitor system calls of an operating system for a system call executing a binary file, wherein the binary file is associated with a build identifier; upon execution of the binary file, decode a portion of the memory associated with the execution of the binary file to determine whether the binary file is associated with the build identifier; and upon determining the execution of the binary file corresponds to the build identifier, load a portion of object code into the portion of the memory associated with the binary file, wherein the portion of object code modifies a functionality of the binary file during execution.

In a 36th exemplary aspect of the present disclosure, which may be used in combination with any one or more of the preceding aspects (i.e., the 35th aspect), where the system call is an exec command.

In a 37th exemplary aspect of the present disclosure, which may be used in combination with any one or more of the preceding aspects (i.e., the 35th aspect), where the system call is a mmap command.

In a 38th exemplary aspect of the present disclosure, which may be used in combination with any one or more of the preceding aspects (i.e., the 35th aspect), where the portion of object code attaches instrumentation to the binary file during runtime.

In a 39th exemplary aspect of the present disclosure, which may be used in combination with any one or more of the preceding aspects (i.e., the 38th aspect), where the instrumentation includes debugging tools.

In a 40th exemplary aspect of the present disclosure, which may be used in combination with any one or more of the preceding aspects (i.e., the 35th aspect), where, when executed by the processor, is configured to: intercept a second system call executing a second binary file, wherein the second binary file is associated with a second build identifier; upon execution of the second binary file, decode a second portion of the memory associated with the execution of the second binary file to determine whether the second binary file is associated with the build identifier; upon determining the execution of the second binary file corresponds to the second build identifier, load a second portion of object code into the second portion of memory associated with the second binary file, wherein the second portion of object code modifies a functionality of the second binary file during execution.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A computer implemented method, comprising:
    receiving a task, wherein the task includes a portion of object code associated with a version of a binary file and a hash identifier associated with the version of the binary file;
    accessing a database mapping hash identifier to respective debug information associated with each version of one or more installed binary files;
    retrieving, via the database, debug information for the version of the binary file associated with the hash identifier; and
    building a probing application, using the debug information, including the portion of object code, wherein in response to detecting a system call related to a request for starting execution of the version of the binary file loaded in a portion of a memory, the probing application places the object code, into the portion of the memory storing the version of the binary file, before a start of the execution of the version of the binary file.

2. The computer implemented method of claim 1, wherein the debug information includes source code of the version of the binary file associated with the hash identifier.

3. The computer implemented method of claim 1, wherein the debug information includes debugging tools for debugging the version of the binary file associated with the hash identifier.

4. The computer implemented method of claim 1, wherein retrieving further comprises:
    upon determining that the version of the binary file associated with the hash identifier is not installed, installing the version of the binary file associated with the hash identifier; and
    after the binary file is installed, attempting to retrieve the debug information of the binary file associated with the hash identifier.

5. The computer implemented method of claim 1, wherein building the probing application further comprises:
    modifying the portion of object code using the debug information retrieved from the database.

6. The computer implemented method of claim 1, wherein the portion of object code outputs debugging information from the binary file during runtime.

7. The computer implemented method of claim 1, wherein the portion of object code patches a bug during runtime of the binary file.

8. A system, comprising:
    a memory; and
    one or more processors in communication with the memory, wherein the one or more processors are configured to:
        receive a task, wherein the task includes a portion of object code associated with a version of a binary file and a hash identifier associated with the version of the binary file;
        access a database mapping hash identifiers to respective debug information associated with each version of one or more installed binary files;
        retrieve, via the database, debug information for the version of the binary file associated with the hash identifier; and
        build a probing application, using the debug information, including the portion of object code, wherein in response to detecting a system call related to a request for starting execution of the version of the binary file loaded in a portion of the memory, the probing application places the object code, into the portion of the memory storing the version of the binary file, before a start of the execution of the version of the binary file.

9. The system of claim 8, wherein the debug information includes source code of the version of the binary file associated with the hash identifier.

10. The system of claim 8, wherein the debug information includes debugging tools for debugging the version of the binary file associated with the hash identifier.

11. The system of claim 8, wherein retrieving further comprises:
    upon determining that the version of the binary file associated with the hash identifier is not installed, installing the version of the binary file associated with the hash identifier; and
    after the binary file is installed, attempting to retrieve the debug information of the binary file associated with the hash identifier.

12. The system of claim 8, wherein building the probing application further comprises:
    modifying the portion of object code using the debug information retrieved from the database.

13. The system of claim 8, wherein the portion of object code outputs debugging information from the binary file during runtime.

14. The system of claim 8, wherein the portion of object code patches a bug during runtime of the binary file.

15. A system, comprising:
a memory;
one or more processors in communication with the memory; and
an operating system to execute on the one or more processors, wherein the one or more processors are configured to execute a probing application to:
monitor system calls of the operating system for a system call related to a request for starting execution of a binary file, wherein the binary file is associated with a build identifier and loaded into a portion of the memory;
in response to detecting the system call, decode the portion of the memory storing the binary file to determine whether the binary file is associated with the build identifier; and
upon determining that the binary file corresponds to the build identifier, which identifies a history of builds, load a portion of object code into the portion of the memory storing the binary file before a start of the execution of the binary file, wherein the portion of object code modifies a functionality of the binary file during execution.

16. The system of claim 15, wherein the system call is an exec command.

17. The system of claim 15, wherein the system call is a mmap command.

18. The system of claim 15, wherein the portion of object code attaches instrumentation to the binary file during runtime.

19. The system of claim 18, wherein the instrumentation includes debugging tools.

20. The system of claim 15, wherein the one or more processors are further configured to:
intercept a second system call executing a second binary file, wherein the second binary file is associated with a second build identifier;
upon execution of the second binary file, decode a second portion of the memory associated with the execution of the second binary file to determine whether the second binary file is associated with the build identifier; and
upon determining the execution of the second binary file corresponds to the second build identifier, load a second portion of object code into the second portion of memory associated with the second binary file, wherein the second portion of object code modifies a functionality of the second binary file during execution.

* * * * *

UNITED STATES PATENT AND TRADEMARK OFFICE
CERTIFICATE OF CORRECTION

PATENT NO. : 11,599,342 B2
APPLICATION NO. : 17/034832
DATED : March 7, 2023
INVENTOR(S) : Eigler et al.

It is certified that error appears in the above-identified patent and that said Letters Patent is hereby corrected as shown below:

In the Claims

In Column 15, Line 51 Claim 1, replace "hash identifier" with -- hash identifiers --.

Signed and Sealed this
Eighth Day of August, 2023

Katherine Kelly Vidal
*Director of the United States Patent and Trademark Office*